US008892137B2

(12) United States Patent
Hanchate et al.

(10) Patent No.: US 8,892,137 B2
(45) Date of Patent: Nov. 18, 2014

(54) METHOD AND APPARATUS FOR OPTIMIZING CBS SERVICE IN A MULTIPLE SIM ENVIRONMENT

(75) Inventors: Naveen Kumar Hanchate, San Diego, CA (US); Sudheer Kulakcherla, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 311 days.

(21) Appl. No.: 13/332,745

(22) Filed: Dec. 21, 2011

(65) Prior Publication Data

US 2013/0150096 A1 Jun. 13, 2013

Related U.S. Application Data

(60) Provisional application No. 61/569,056, filed on Dec. 9, 2011.

(51) Int. Cl.
*H04Q 7/20* (2006.01)
(52) U.S. Cl.
USPC ............. 455/466; 455/426.1; 455/422.1; 455/412.1; 455/412.2; 455/558
(58) Field of Classification Search
USPC .............. 455/412.2, 466, 422.1, 422.2
See application file for complete search history.

(56) References Cited

U.S. PATENT DOCUMENTS

| 7,929,993 | B2 | 4/2011 | Nagarajan |
| 8,010,152 | B2 | 8/2011 | Kim |
| 2002/0103009 | A1* | 8/2002 | Sato .......................... 455/558 |
| 2005/0176445 | A1 | 8/2005 | Qu et al. |
| 2010/0279698 | A1 | 11/2010 | Wong |
| 2010/0304782 | A1 | 12/2010 | Chang et al. |
| 2011/0217969 | A1 | 9/2011 | Spartz et al. |

FOREIGN PATENT DOCUMENTS

EP 2302973 A1 3/2011

OTHER PUBLICATIONS

GSM, 3GPP TS 23.041 V9.4.0, Jun. 2010. Release 9.*
"3rd Generation Partnership Project; Technical Specification Group Core Network and Terminals; Technical realization of Cell Broadcast Service (CBS) (Release 11)", 3GPP Standard; 3GPP TS 23.041, 3rd Generation Partnership Project (3GPP), Mobile Competence Centre ; 650, Route Des Lucioles ; F-06921 Sophia Antipolis Cedex ; France, No. V11.0.0, Dec. 17, 2010, pp. 1-48, XP050462237, [retrieved on Dec. 17, 2010].
International Search Report and Written Opinion—PCT/US2012/068042—ISA/EPO—Mar. 5, 2013.

* cited by examiner

*Primary Examiner* — Charles Appiah
*Assistant Examiner* — Randy Peaches
(74) *Attorney, Agent, or Firm* — Donald C. Kordich

(57) ABSTRACT

In a communication device having multiple subscriber identification modules (SIMs), the processing of cell broadcast service (CBS) messages is optimized. A geographic scope of an incoming CBS message is determined. If all SIMs belong to the determined geographic scope, the message is only received and processed by a single one of the SIMs.

16 Claims, 5 Drawing Sheets

METHOD AND APPARATUS FOR OPTIMIZING CBS SERVICE IN A MULTIPLE SIM ENVIRONMENT

CLAIM OF PRIORITY UNDER 35 U.S.C. §119

The present application for Patent claims priority to Provisional Application No. 61/569,056 entitled "CBS Service for Dual SIM Capable UE" filed Dec. 9, 2011, and assigned to the assignee hereof and hereby expressly incorporated by reference herein.

BACKGROUND

1. Field

This application relates generally to cell broadcast service (CBS) message processing, and more particularly to efficiently processing CBS messages in devices having multiple subscriber identification modules (SIMs).

2. Background

Cell Broadcast Service (CBS) allows cell operators to broadcast messages to user equipments (UEs) or mobile stations (MSs) in a particular region. The CBS messages may contain information related to traffic, weather, general advertisements, emergency related messages, etc. The geographical scope of a CBS message may be one cell within a public land mobile network (PLMN), a group of cells in a PLMN, or the entire PLMN. A CBC broadcasts the CBS messages to the UE/MS in a particular area based on the geographical scope of the message. A device user may select the types of CBS messages, e.g. weather, sports, traffic, etc., they wish to subscribe to by selecting associated identification codes and/or through a user interface (UI). For UEs/MSs with dual subscriber identification module (SIM) cards, such as a Dual SIM Dual Standby UE, if both SIMs are from the same operator or if there is a roaming agreement between two operators, there is a chance that both SIMs will receive the same CBS messages. This creates an increase in power consumption as well as unnecessary duplication of messages.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to some aspects, a method for cell broadcast service (CBS) message reception comprises determining whether both a first subscriber identification module (SIM) and a second SIM in a communication device have communication established in a same public land mobile network (PLMN); upon determining that both the first SIM and the second SIM have communication established in the same PLMN, generating a combined CBS message identifier (ID) list, the combined CBS message ID list including message identifiers from the first SIM and the second SIM; determining a geographic scope associated with a received CBS message; instructing a selected one of the first SIM and the second SIM to monitor and process the CBS message when the first SIM and the second SIM have communication established in the determined geographic scope; and instructing a remaining one of the first SIM and the second SIM not to monitor and process the CBS message.

According to some aspects, an apparatus for cell broadcast service (CBS) message reception comprises at least one processor configured to determine whether both a first SIM and a second SIM have communication established in a same PLMN; upon determining that both the first SIM and the second SIM have communication established in the same PLMN, generate a combined CBS message identifier (ID) list, the combined CBS message ID list including message identifiers from the first SIM and the second SIM; determine a geographic scope associated with a received CBS message; instruct a selected one of the first SIM and the second SIM to monitor and process the CBS message when the first SIM and the second SIM have communication established in the determined geographic scope; and instruct a remaining one of the first SIM and the second SIM not to monitor and process the CBS message; and a memory coupled to the at least one processor.

According to some aspects, a computer program product comprises a computer-readable medium, comprising a first set of instructions for causing a computer to determine whether both a first SIM and a second SIM in a communication device have communication established in a same PLMN; a second set of instructions for causing the computer to generate a combined CBS message ID list upon determining that both the first SIM and the second SIM have communication established in the same PLMN, the combined message ID list including message identifiers from the first SIM and the second SIM; a third set of instructions for causing the computer to determine a geographic scope associated with a received CBS message; a fourth set of instructions for causing the computer to instruct a selected one of the first SIM and the second SIM to monitor and process the CBS message when the first SIM and the second SIM have communication established in the determined geographic scope; and a fifth set of instructions for causing the computer to instruct a remaining one of the first SIM and the second SIM not to monitor and process the CBS message.

According to some aspects, an apparatus comprises means for determining whether both a first SIM and a second SIM in a communication device have communication established in a same PLMN; means for generating a combined CBS message ID list upon determining that both the first SIM and the second SIM have communication established in the same PLMN, the combined message ID list including message identifiers from the first SIM and the second SIM; means for determining a geographic scope associated with a received CBS message; means for instructing a selected one of the first SIM and the second SIM to monitor and process the CBS message when the first SIM and the second SIM have communication established in the determined geographic scope; and means for instructing a remaining one of the first SIM and the second SIM not to monitor and process the CBS message.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The apparatus and methods described herein provide power consumption savings and reduce the duplication of CBS messages in a multiple SIM device by optimizing the reception of CBS messages. A combined set of CBS message identifiers for all SIMs in a device may created, and one of a plurality of SIMs in the device may be selected to receive all CBS messages as long as all SIMS are in communication in the same area. Further, the other SIMs in the device may be instructed to stop listening for and/or decoding CBS messages. Thus, less power is consumed, and duplicate CBS messages are not received and processed on multiple SIMs in the same device.

Figure 1:
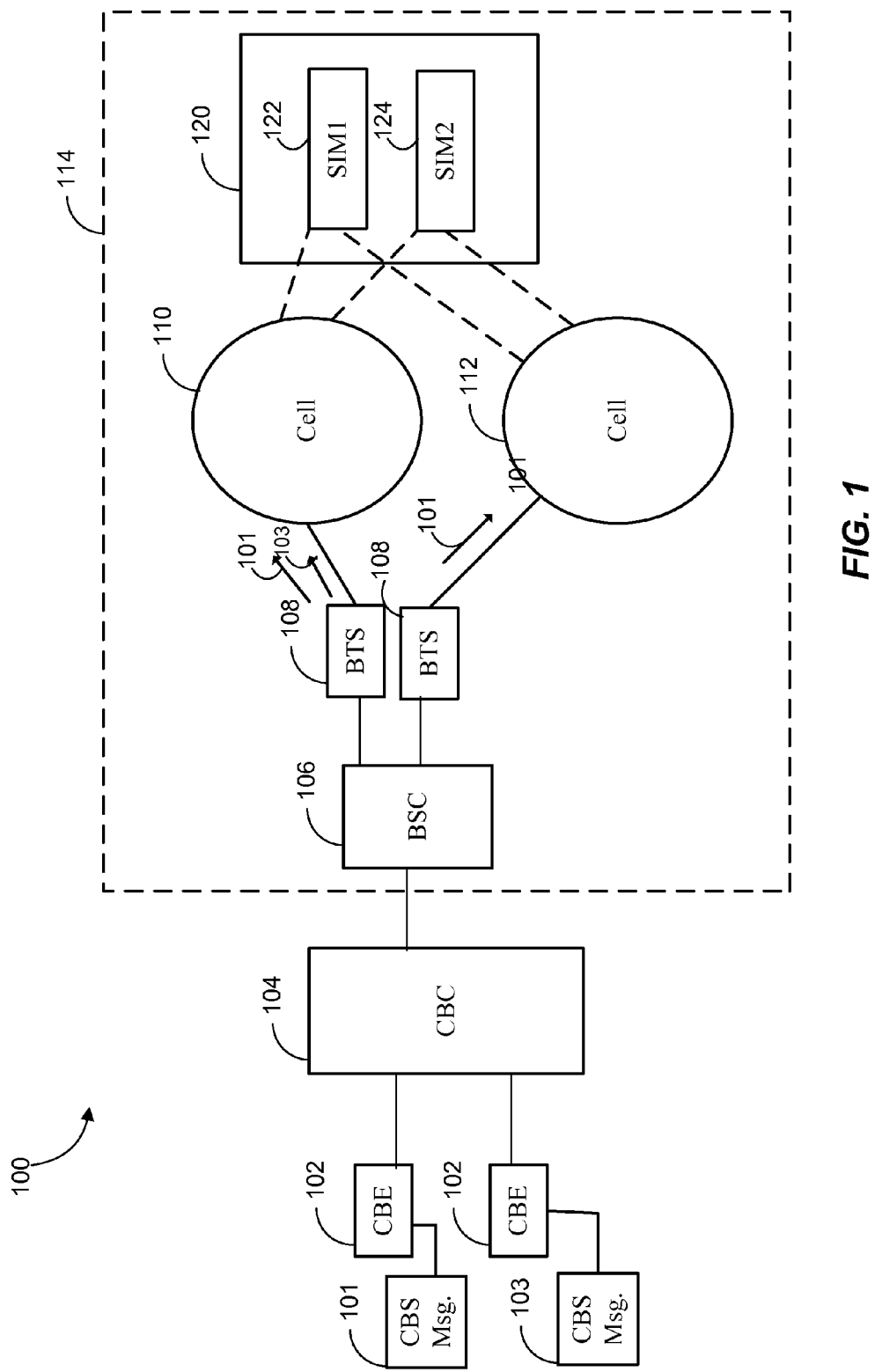
FIG. 1 illustrates an exemplary cell broadcast service network, in accordance with some aspects.

FIG. 1 depicts an exemplary cell broadcast system 100 that may implement various aspects disclosed herein. Cell Broadcast Service (CBS) messages, such as CBS messages 101 and 103, may contain information related to one or more of traffic, weather, general advertisements, emergency related messages, etc. CBS messages 101, 103 may originate from one or more Cell Broadcast Entities (CBEs) 102 which are connected to a Cell Broadcast Center (CBC) 104. Each CBS message 101, 103 may have associated therewith a geographic scope indicating the range of the message. The geographic scope of a CBS message may be, for example, one cell within a PLMN, a group of cells in the PLMN, or the entire PLMN. The CBC 104 broadcasts the CBS messages 101, 103 according to their respective geographic scopes to one or more communication devices 120 via base station controller (BSC) 106 and one or more base transceiver stations (BTS) 108. BSC 106, BTSs 108, and communication device 120 may be located within a public land mobile network (PLMN) 114 having one or more cells, such as cell 110 and cell 112. Communication device 120 communicates with one or more of the network entities by registering with an active cell in the PLMN, and thus communication device 120 may receive one or more of CBS messages 101, 103.

As shown in FIG. 1, communication device 120 may comprise multiple subscriber identification module (SIM) cards, such as a first SIM (SIM1) 122 and a second SIM (SIM2) 124. While communication device 120 is shown having two SIMs, additional SIMs may be included. Each SIM card may be registered on a particular cell within the PLMN. Both SIMs may be connected to the same cell in some aspects, while in other aspects, each SIM may connect to a different cell. Also, in some aspects, each SIM may be associated with a different network carrier. In other aspects, each SIM may be associated with the same network carrier, but may be used for different purposes. For example, a first SIM may be used for business while a second SIM is used for personal communication.

Figure 2:
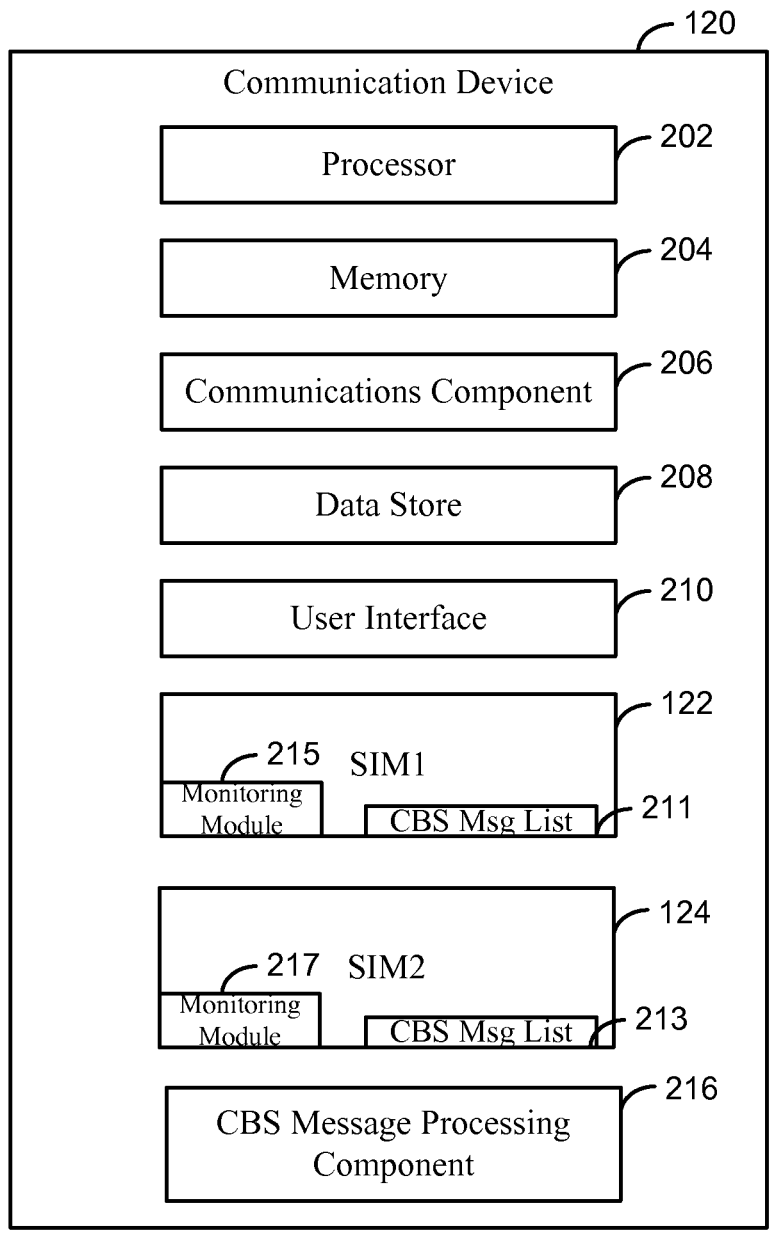
FIG. 2 illustrates a communication device, in accordance with some aspects.

FIG. 2 depicts communication device 120 in further detail. Communication device 120 may include a processor 202 for carrying out processing functions associated with one or more components and functions described herein. Processor 202 can include a single or multiple set of processors or multi-core processors. Moreover, processor 202 can be implemented as an integrated processing system and/or a distributed processing system.

Communication device 120 further includes a memory 204, such as for storing data used herein and/or local versions of applications being executed by processor 202. Memory 204 can include any type of memory usable by a computer, such as random access memory (RAM), read only memory (ROM), tapes, magnetic discs, optical discs, volatile memory, non-volatile memory, and any combination thereof. Applications may include, for example, one or more context-specific pattern matching applications.

Further, communication device 120 may include a communications component 206 that provides for establishing and maintaining communications with one or more parties utilizing hardware, software, and services as described herein. Communications component 206 may carry communications between components on communication device 120, as well as between communication device 120 and external devices, such as devices located across a communications network and/or devices serially or locally connected to communication device 120. For example, communications component 206 may include one or more buses, and may further include transmit chain components and receive chain components associated with a transmitter and receiver, respectively, operable for interfacing with external devices. Communications component 206 may also be configured to interact with SIMs in the device, such as SIMs 122, 124.

Additionally, communication device 120 may further include a data store 208, which can be any suitable combination of hardware and/or software, that provides for mass storage of information, databases, and programs employed in connection with aspects described herein. For example, data store 208 may be a data repository for applications not currently being executed by processor 202.

Communication device 120 may additionally include a user interface component 210 operable to receive inputs from a user of communication device 120, and further operable to generate outputs for presentation to the user. User interface component 210 may include one or more input devices, including but not limited to a keyboard, a number pad, a mouse, a touch-sensitive display, a navigation key, a function key, a microphone, a voice recognition component, a still camera, a video camera, an audio recorder, and/or any other mechanism capable of receiving an input, or any combination thereof. Further, user interface component 210 may include one or more output devices, including but not limited to a display, a speaker, a haptic feedback mechanism, a printer, any other mechanism capable of presenting an output, or any combination thereof.

Additionally, in some aspects, communication device 120 may be a device having multiple SIMs, such as SIM1 122 and SIM2 124. While only two SIMs are shown, this is only exemplary. Additional SIMs may also be included. Each SIM 122, 124 may maintain a CBS message list 211, 213 indicating the messages/types of messages to be received. Each SIM 122, 124 may also include a CBS message monitoring module 215, 217 for receiving and/or processing messages designated for the respective SIM.

Communication device 120 may also include a CBS messaging processing module 216 configured to perform processing to determine how to manage received CBS messages. For example, in an aspect, CBS messaging processing module 216 may be part of or may be in communication with a wireless messaging layer on communication device 120. Initial processing may include, for example, determining whether both a first SIM and a second SIM in a wireless device have communication established in the determined geographic scope, and generating a combined CBS message list from the individual SIM CBS message lists. In an aspect, for example, CBS message processing module 216 may be configured to determine a communication scope of both the first SIM and the second SIM, and if both have the same scope, to generate the combined CBS message list. CBS messaging processing module 216 may further be configured to instruct one of the SIMS to monitor all CBS messages corresponding to the combined list, and to instruct the other SIM(s) not to monitor CBS messages when all SIMS are within the determined geographical scope of a received CBS message. In an aspect, CBS message processing module 216 may select the one SIM based on its status as the primary SIM in the device. In other aspects, CBS message processing module 216 may select the one SIM based on its discontinuous reception (DRX) performance. For example, the selected SIM may be the SIM with the greatest interval between wakeup periods or the SIM that consumes the least power. Additionally, for example, upon receipt of a CBS message, CBS messaging processing module 216 may perform additional processing, such as determining the geographic scope indicated in the message header, and if it matches the geographic scope of the SIMS, forwarding the CBS message to the one selected SIM for processing.

Figure 3:
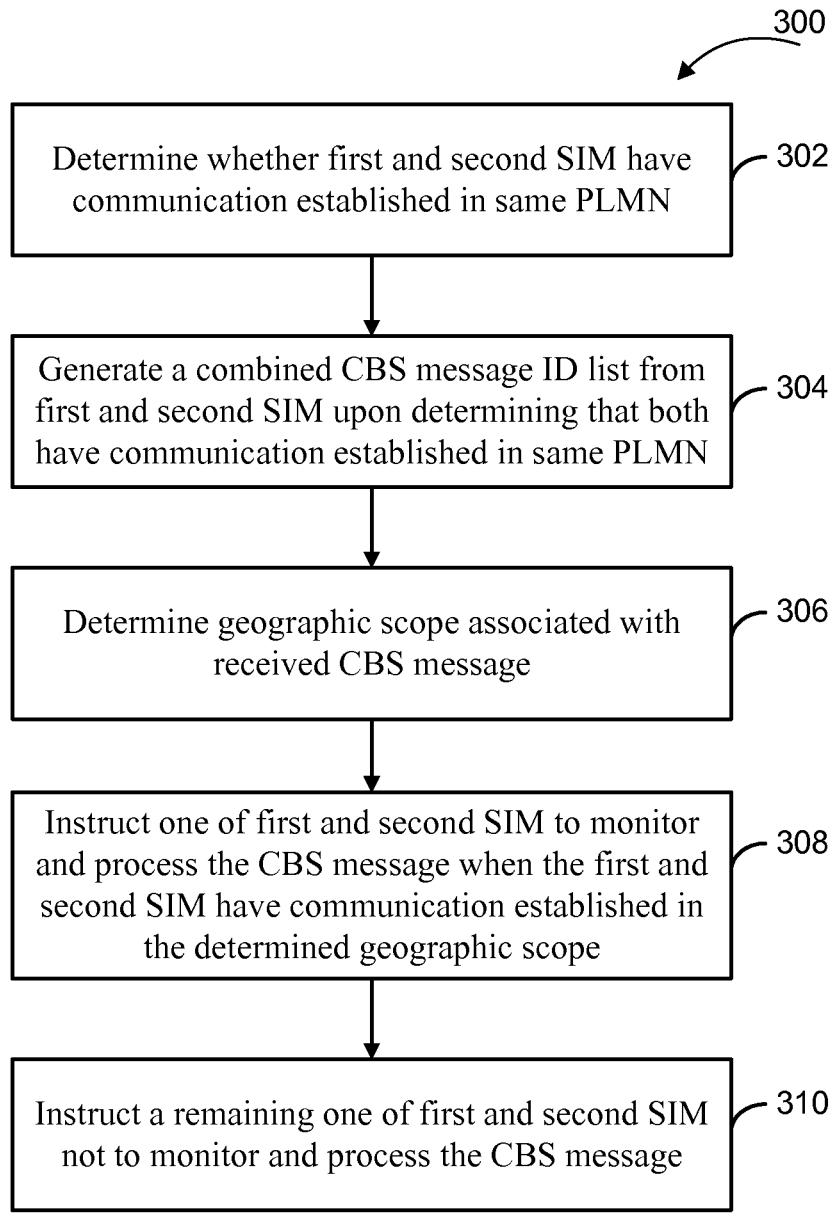
FIG. 3 is a flowchart illustrating cell broadcast message processing, in accordance with some aspects.

Referring to FIG. 3, one aspect of a method 300 for cell broadcast service (CBS) message reception is shown. For example, method 300 may be executed by communication device 120 and/or CBS processing module 216. As depicted at 302, a determination may be made as to whether a first SIM and a second SIM have communication established in the same PLMN. As shown at 304, upon determining that the first and second SIM have communication established in the same PLMN, a combined CBS message ID list from both the first and second SIM may be generated. A geographic scope associated with a received CBS message may then be determined, as shown at 306. A selected one of the first SIM and the second SIM may be instructed to monitor and process the CBS message when the first and the second SIM have communication established in the determined geographic scope, as shown at 308. As shown at 310, a remaining one of the first and second SIM may be instructed not to monitor and process the CBS message.

Figure 4:
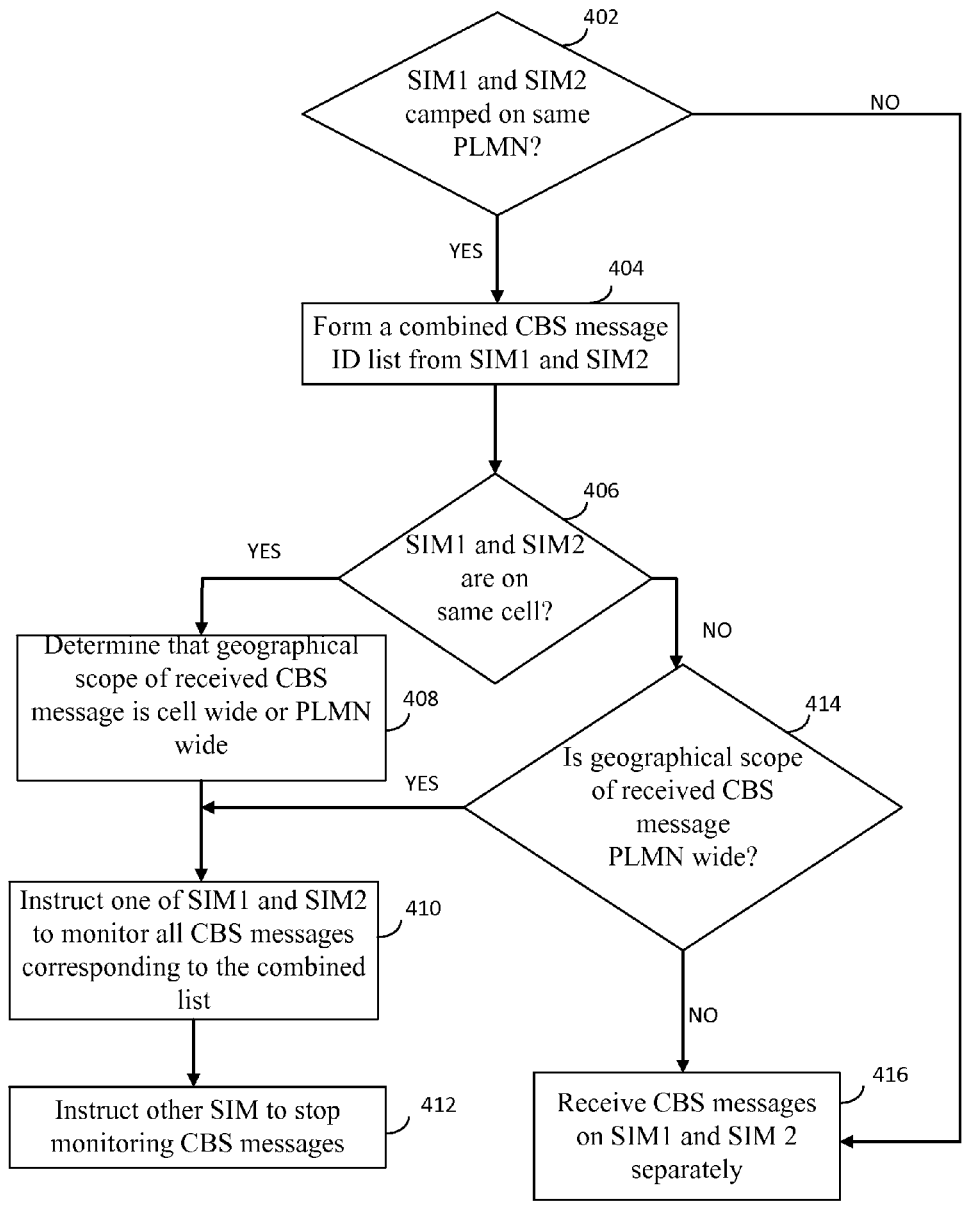
FIG. 4 is a flowchart illustrating one use case for cell broadcast message processing, in accordance with some aspects.

Referring now to FIG. 4, a flowchart depicting one aspect of a particular use case for a CBS message process 400 represented in further detail. For example, process 400 may be executed by communication device 120 and/or CBS processing module 216. Process 400 begins by determining whether a first SIM, SIM1, and a second SIM, SIM2, in a communication device are camped on the same PLMN, as shown at 402. If not, SIM1 and SIM2 continue to separately receive CBS messages, as shown at 416. If SIM1 and SIM2 are camped on the same PLMN, the process may form a combined list of subscribed CBS message identifiers for both SIM1 and SIM2, as shown at 404. This may include, for example, including only a single one of any duplicate message identifiers from SIM1 and SIM2. As shown at 406, the process further determines whether SIM1 and SIM2 are on the same cell. As described above, a PLMN may comprise multiple cells, and each SIM may connect to the same cell, or to different cells. If SIM1 and SIM2 are on the same cell, the process may determine whether the geographical scope of a received CBS message is cell-wide or PLMN-wide, as depicted at 408. In accordance with some aspects, a monitoring component at the wireless messaging layer, such as CBS messaging processing module 216(FIG. 2), determines the geographical scope by examining the message header. For example, the message header may indicate that the scope of the message is PLMN-wide, cell-wide, or covering a group of cells.

Thus, for SIMs camped on the same PLMN and/or same cell, communication resources can be conserved by receiving and processing CBS messages directed to the respective PLMN and/or cell at only one of the SIMs. As depicted at 310, the process includes instructing one of SIM1 and SIM2 to monitor and process all CBS messages corresponding to the combined list. This may include, for example, providing the combined list of subscribed CBS message identifiers to the selected SIM. According to some aspects, the selected SIM is the SIM that has been designated the primary SIM by the user. For example, in an aspect, the primary SIM has priority in receiving incoming calls over other SIMs. In other aspects, the selected SIM may be the SIM with the best discontinuous reception (DRX) performance, which may be, for example, the SIM with the longer interval between wakeup periods or the lower power consumption.

As shown at 412, the non-selected SIM is instructed to stop monitoring for CBS messages. Accordingly, the non-selected SIM is no longer required to wake-up to monitor a control channel for CBS messages, thereby reducing power consumption and the potential for processing the same CBS message on both SIMs. If SIM1 and SIM2 are not within the same cell, as determined at 406, a determination is made as to whether the geographic scope of the received CBS message is PLMN wide, as shown at 414. If so, the process follows steps 410 and 412. If the geographical scope is not PLMN-wide, SIM1 and SIM2 continue to receive CBS messages separately, as shown at 416.

Figure 5:
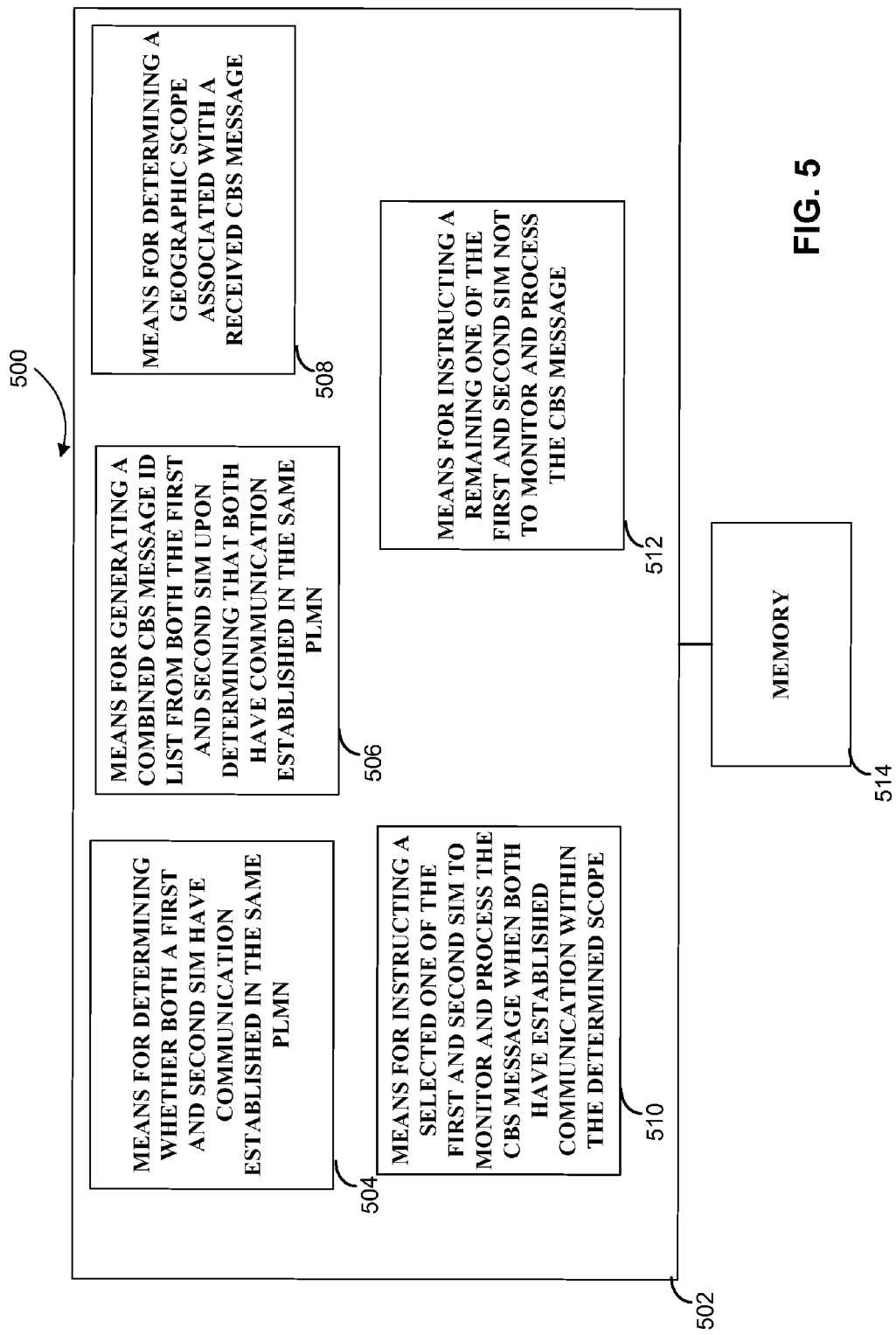
FIG. 5 illustrates an apparatus for processing cell broadcast messages, in accordance with some aspects.

FIG. 5 depicts an apparatus 500 that efficiently processes CBS messages. Apparatus 500 can reside at least partially within communication device 120. It is to be appreciated that apparatus 500 is represented as including functional blocks, which can represent functions implemented by a processor, software, or combination thereof (e.g., firmware). As such, apparatus 500 includes a logical grouping 502 of electrical components that can act in conjunction. For instance, logical grouping 502 can include means for determining whether both a first SIM and a second SIM have communication established in the same PLMN (Block 504). For example, in an aspect, the means 504 may include CBS processing module 216 and/or or processor 202. Further, logical grouping 502 can include means for generating a combined CBS message ID list from both the first and second SIM upon determining that both have communication established in the same PLMN (Block 506). For example, in an aspect, the means 506 can include CBS processing module 216 and/or or processor 202. Logical grouping 502 may also include means for determining a geographic scope associated with a received CBS message (Block 508). Also, logical grouping 502 can include means for instructing a selected one of the first and second SIM to monitor and process the CBS message when the first and the second SIM have communication established in the determined geographic scope (Block 510). For example, in an aspect, the means 510 can include CBS processing module 216 and/or processor 202. Logical grouping 502 may also include means for instructing a remaining one of the first and second SIM not to monitor and process the CBS message (Block 512). For example, in an aspect, the means 512 can include CBS processing module 216 and/or or processor 202.

Additionally, apparatus 500 can include a memory 514 that retains instructions for executing functions associated with blocks 504-512. While shown as being external to memory 514, it is to be understood that one or more of blocks 504-512 can exist within memory 514. In an aspect, for example, memory 514 may be the same as or similar to memory 204 or data store 208 (FIG. 2).

In the subject disclosure, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a communication device, which can be a wired communication device or a wireless communication device. A communication device can also be called a system, device, subscriber unit, subscriber station, mobile station, mobile, mobile device, remote station, remote terminal, access terminal, user terminal, terminal, communication device, user agent, user device, or user equipment (UE). A wireless communication device may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for handling cell broadcast service (CBS) messages comprising:
   determining, in a communication device, whether a first subscriber identification module (SIM) and a second SIM in the communication device have communication established in a same public land mobile network (PLMN);
   determining a geographic scope associated with a received CBS message, the geographic scope indicating a message coverage including at least one cell;
   instructing a selected one of the first SIM and the second SIM to monitor and process the CBS message when the first SIM and the second SIM have the communication established in the determined geographic scope associated with the received CBS message; and
   instructing a remaining one of the first SIM and the second SIM not to monitor and process the CBS message, wherein the selected one of the first SIM and the second SIM instructed to monitor the CBS message is the first SIM or second SIM with a better discontinuous reception (DRX) performance;
   wherein the SIM with the better performance further comprises:
   determining a first value of a first interval between wakeup periods or a first value of a first power consumption during a first DRX performance of the first SIM;
   determining a second value of a second interval between wakeup periods or a second value of a second power consumption of a second DRX performance of the second SIM; and
   determining which one of the first value or the second value is greater or consumes less power;
   wherein the selected one of the first SIM and the second SIM comprises the one corresponding to the determined one of the first value or the second value that is greater or consumes less power.

2. The method of claim 1, further comprising, upon determining that both the first SIM and the second SIM have communication established in the same PLMN, generating a combined CBS message identifier (ID) list of the communication device, the combined CBS message ID list including message identifiers obtained from the first SIM and the second SIM of the communication device;
   wherein the first SIM is set up to monitor a first set of CBS messages and the second SIM is set up to monitor a second set of CBS messages, wherein the combined CBS message ID list includes only a single one of any duplicate identifiers of CBS messages from the first set of CBS messages and the second set of CBS messages; and
   wherein the received CBS message comprises an identifier matching one of the identifiers in the combined CBS message ID list.

3. The method of claim 2, wherein generating the combined CBS message ID list further comprises:
   identifying unique message identifiers and duplicate message identifiers corresponding to CBS messages from the first set of CBS messages and the second set of CBS messages; and
   adding each of the unique message identifiers and only a single instance of the duplicate message identifiers to the combined CBS message ID list.

4. The method of claim 2, wherein the identifier of the received CBS message matches an identifier of a CBS message to be monitored by the selected one of the first SIM and the second SIM or the remaining one of the first SIM and the second SIM.

5. The method of claim 1, wherein instructing the remaining one of the first SIM and the second SIM not to monitor and process the CBS message further comprises instructing a physical layer of a protocol stack corresponding to the remaining one of the first SIM and the second SIM not to monitor and process the CBS message.

6. The method of claim 1, wherein the determined geographic scope is PLMN-wide or cell-wide.

7. The method of claim 1, further comprising instructing a selected one of the first SIM and the second SIM having the communication established in the determined geographic scope to monitor and process the CBS message when the first SIM and the second SIM are not both located within the determined geographic scope.

8. An apparatus for handling cell broadcast service (CBS) messages comprising: at least one memory coupled to a processor configured to:
- determine whether a first subscriber identification module (SIM) and a second SIM of the apparatus have communication established in a same public land mobile network (PLMN);
- determine a geographic scope associated with a received CBS message the geographic scope indicating a range of coverage including at least one cell;
- instruct a selected one of the first SIM and the second SIM to monitor and process the CBS message when the first SIM and the second SIM have the communication established in the determined geographic scope associated with the received CBS message; and
- instruct a remaining one of the first SIM and the second SIM not to monitor and process the CBS message, wherein the selected one of the first SIM and the second SIM instructed to monitor the CBS message is the first SIM or second SIM with a better discontinuous reception (DRX) performance;
  - wherein the SIM's processor with the better performance further comprises:
- determining a first value of a first interval between wakeup periods or a first value of a first power consumption during a first DRX performance of the first SIM;
- determining a second value of a second interval between wakeup periods or a second value of a second power consumption of a second DRX performance of the second SIM; and
- determining which one of the first value or the second value is greater or consumes less power;
  - wherein the selected one of the first SIM and the second SIM comprises the one corresponding to the determined one of the first value or the second value that is greater or consumes less power.

9. The apparatus of claim 8, wherein the at least one processor is further configured to, upon determining that both the first SIM and the second SIM of the apparatus have communication established in the same PLMN, generate a combined CBS message identifier (ID) list of the apparatus, the combined CBS message ID list including message identifiers from the first SIM and the second SIM of the apparatus;
- wherein the first SIM is set up to monitor a first set of CBS messages and the second SIM is set up to monitor a second set of CBS messages, wherein the combined CBS message ID list includes only a single one of any duplicate identifiers of CBS messages from the first set of CBS messages and the second set of CBS messages, and
- wherein the received CBS message comprises an identifier matching one of the identifiers in the combined CBS message ID list.

10. The apparatus of claim 9, wherein the identifier of the received CBS message matches an identifier of a CBS message to be monitored by the selected one of the first SIM and the second SIM or the remaining one of the first SIM and the second SIM.

11. The apparatus of claim 9, wherein the at least one processor configured to generate the combined CBS message ID list is further configured to:
- identify unique message identifiers and duplicate message identifiers corresponding to CBS messages from the first set of CBS messages and the second set of CBS messages; and
- add each of the unique message identifiers and only a single instance of the duplicate message identifiers to the combined CBS message ID list.

12. The apparatus of claim 8, wherein the at least one processor configured to instruct the remaining one of the first SIM and the second SIM not to monitor and process the CBS message is further configured to instruct a physical layer of a protocol stack corresponding to the remaining one of the first SIM and the second SIM not to monitor and process the CBS message.

13. The apparatus of claim 8, wherein the determined geographic scope is PLMN-wide or cell-wide.

14. The apparatus of claim 8, wherein the at least one processor is further configured to instruct a determined one of the first SIM and the second SIM having the communication established in the determined geographic scope to monitor and process the CBS message when the first SIM and the second SIM are not both located within the determined geographic scope.

15. A computer program product, comprising: a non-transitory computer-readable medium, comprising:
- a first set of instructions for causing a computer to determine whether a first subscriber identification module (SIM) and a second SIM in a communication device have communication established in a same public land mobile network (PLMN);
- a second set of instructions for causing the computer to determine a geographic scope associated with a received cell broadcast service (CBS) message, wherein the geographic scope indicates a message coverage including at least one cell;
- a third set of instructions for causing the computer to instruct a selected one of the first SIM and the second SIM to monitor and process the CBS message when the first SIM and the second SIM have the communication established in the determined geographic scope associated with the received CBS message; and
- a fourth set of instructions for causing the computer to instruct a remaining one of the first SIM and the second SIM not to monitor and process the CBS message, wherein the selected one of the first SIM and the second SIM instructed to monitor the CBS message is the first SIM or second SIM with a better discontinuous reception (DRX) performance;
  - wherein the SIM with the better performance further comprises:
- determining a first value of a first interval between wakeup periods or a first value of a first power consumption during a first DRX performance of the first SIM;
- determining a second value of a second interval between wakeup periods or a second value of a second power consumption of a second DRX performance of the second SIM; and
- determining which one of the first value or the second value is greater or consumes less power;
  - wherein the selected one of the first SIM and the second SIM comprises the one corresponding to the determined one of the first value or the second value that is greater or consumes less power.

16. An apparatus, comprising:
- means for determining whether both a first subscriber identification module (SIM) and a second SIM in a communication device have communication established in a same public land mobile network (PLMN);
- means for determining a geographic scope associated with a received cell broadcast service (CBS) message, wherein the geographic scope indicates a message coverage including at least one cell;

means for instructing a selected one of the first SIM and the second SIM to monitor and process the CBS message when the first SIM and the second SIM have the communication established in the determined geographic scope associated with the received CBS message; and means for instructing a remaining one of the first SIM and the second SIM not to monitor and process the CBS message, wherein the selected one of the first SIM and the second SIM instructed to monitor the CBS message is the first SIM or second SIM with a better discontinuous reception (DRX) performance;

wherein the SIM with the better performance further comprises:

determining a first value of a first interval between wakeup periods or a first value of a first power consumption during a first DRX performance of the first SIM;

determining a second value of a second interval between wakeup periods or a second value of a second power consumption of a second DRX performance of the second SIM; and determining which one of the first value or the second value is greater or consumes less power;

wherein the selected one of the first SIM and the second SIM comprises the one corresponding to the determined one of the first value or the second value that is greater or consumes less power.

* * * * *